(12) United States Patent
Horiuchi

(10) Patent No.: US 11,225,965 B2
(45) Date of Patent: Jan. 18, 2022

(54) SCREW ROTOR AND FLUID MACHINE BODY

(71) Applicant: Hitachi Industrial Equipment Systems Co., Ltd., Tokyo (JP)

(72) Inventor: Hiroshi Horiuchi, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 16/980,499

(22) PCT Filed: Mar. 14, 2019

(86) PCT No.: PCT/JP2019/010465
§ 371 (c)(1),
(2) Date: Sep. 14, 2020

(87) PCT Pub. No.: WO2019/188323
PCT Pub. Date: Oct. 3, 2019

(65) Prior Publication Data
US 2021/0025386 A1    Jan. 28, 2021

(30) Foreign Application Priority Data
Mar. 30, 2018 (JP) .............................. JP2018-066557

(51) Int. Cl.
*F04C 2/16* (2006.01)
*B33Y 80/00* (2015.01)
(Continued)

(52) U.S. Cl.
CPC ................ *F04C 2/16* (2013.01); *B33Y 80/00* (2014.12); *F01C 1/16* (2013.01); *F04C 18/16* (2013.01);
(Continued)

(58) Field of Classification Search
CPC ............ F04C 2/16–20; F04C 18/16–20; F04C 2250/20; F04C 2240/20; F01C 1/16–20
See application file for complete search history.

(56) References Cited

U.S. PATENT DOCUMENTS

2001/0031213 A1* 10/2001 Liu ........................... F01C 1/16
                                                                    418/77
2016/0123327 A1    5/2016 Collins et al.

FOREIGN PATENT DOCUMENTS

DE        20023087 U1 * 11/2002 .............. F04C 18/16
JP        H08284856 A  * 10/1996
(Continued)

OTHER PUBLICATIONS

International Search Report (PCT/ISA/210) issued in PCT Application No. PCT/JP2019/010465 dated Jul. 2, 2019 with English translation (four (4) pages).

(Continued)

Primary Examiner — Laert Dounis
(74) Attorney, Agent, or Firm — Crowell & Moring LLP

(57) ABSTRACT

The invention reduces a pressure or thermal effect while reducing the mass of a screw rotor. There is provided a screw rotor having a helical tooth on an outer periphery, the helical tooth extending by a predetermined length in an axial direction, in which a radial cross section of the screw rotor includes a lobe portion having a predetermined thickness in a direction toward an axis and forming the helical tooth, and a hollow portion extending from an axial side inner surface of the lobe portion toward an axial side, and the predetermined thickness of the lobe portion differs between a high load side on the outer periphery of the screw rotor and a low load side on the outer periphery.

20 Claims, 9 Drawing Sheets

(51) Int. Cl.
*F01C 1/16* (2006.01)
*F04C 18/16* (2006.01)

(52) U.S. Cl.
CPC ...... *F04C 2240/20* (2013.01); *F04C 2250/20* (2013.01)

(56) References Cited

FOREIGN PATENT DOCUMENTS

| | | | |
|---|---|---|---|
| JP | H09209947 A | * | 8/1997 |
| JP | 2002-536593 A | | 10/2002 |
| JP | 2004144035 A | * | 5/2004 |
| JP | 2006-214366 A | | 8/2006 |
| JP | 2006214366 A | * | 8/2006 |
| JP | 2008-127990 A | | 6/2008 |
| JP | 2008127990 A | * | 6/2008 |
| WO | WO 2019/073679 A1 | | 4/2019 |

OTHER PUBLICATIONS

Japanese-language Written Opinion (PCT/ISA/237) issued in PCT Application No. PCT/JP2019/010465 dated Jul. 2, 2019 (four (4) pages).

* cited by examiner

F I G. 8
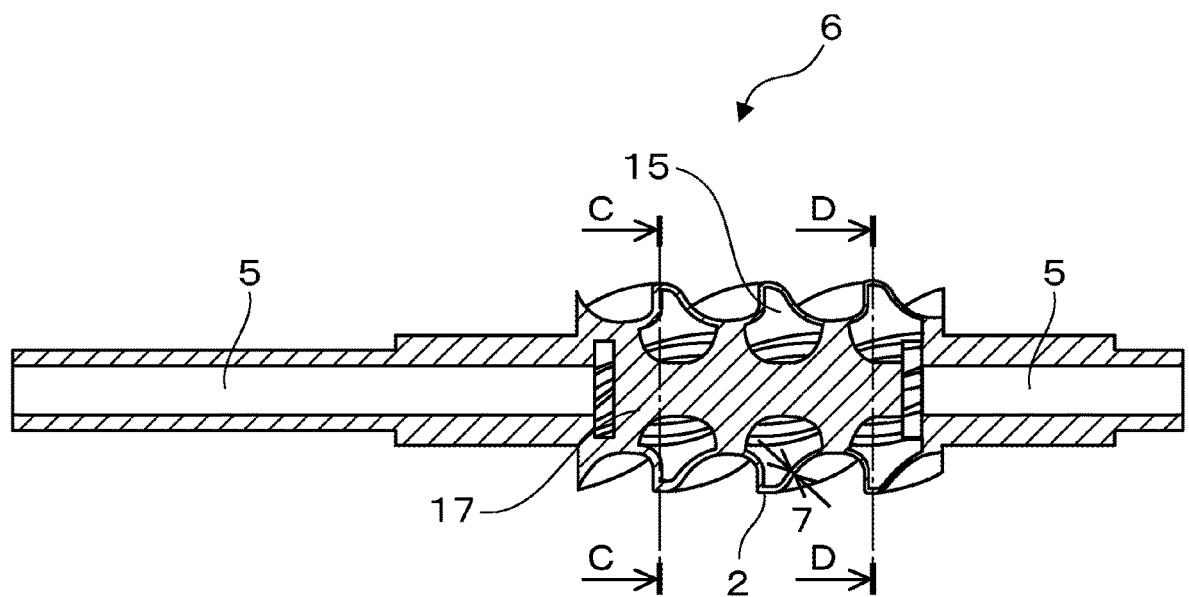

SCREW ROTOR AND FLUID MACHINE BODY

TECHNICAL FIELD

The present invention relates to a screw rotor and a fluid machine main body, particularly to a screw rotor including a hollow portion inside a screw and a fluid machine main body.

BACKGROUND ART

As a fluid machine such as a gas compressor, a pump, or an expander, there is known a fluid machine using a screw rotor.

When the screw rotor is, for example, a twin screw rotor, the teeth and the grooves of male and female rotors mesh with each other, a pressure working space is formed by the male and female rotors and an inner wall of a bore of a casing covering the rotors, and the male and female rotors rotate to generate compressed gas or high-pressure liquid in a compressor or pump. In addition, in the expander, reversely to the compressor or pump, high-pressure gas or liquid flows into an expansion working chamber and expand to rotate male and female rotors.

Generally, the screw rotor is solid, and thus the mass is heavy. Inertia related to rotational power for compression or expansion becomes power loss.

For this reason, Patent Document 1 discloses a screw rotor having a hollow structure for purpose of reducing the weight and the inertia moment. A hollow rotor has an advantage such as being able to reduce the power loss by the amount of a reduction in mass.

CITATION LIST

Patent Document

Patent Document 1: JP 2006-214366 A

SUMMARY OF THE INVENTION

Problems to be Solved by the Invention

Here, in the compressor or the like, the screw rotor has a characteristic that a low pressure and a high pressure occur in an axial direction on an intake side and a discharge side. The expander has a reverse characteristic. In the hollow screw rotor, the larger a hollow portion is, the more the weight reduction merit is exhibited, which contributes to a reduction in drive loss. The thickness of a tooth groove is made as thin as possible to make the hollow portion large; however, when the thickness is reduced uniformly in an axial direction, the screw rotor may be deformed or broken by a load such as the load of gas applied to the surface of the screw rotor on a high pressure side of a compression working chamber. Namely, the amount of a difference in pressure applied to the surface of the screw rotor between an intake side and a discharge side is required to be taken into account in setting the strength.

A technique of reducing a pressure or thermal effect while reducing the mass of the screw rotor is desired.

Solutions to Problems

In order to solve the above problems, for example, the configurations described in the claims are applied. Namely, there is provided a screw rotor having a helical tooth on an outer periphery, the helical tooth extending by a predetermined length in an axial direction, in which a radial cross section of the screw rotor includes a lobe portion having a predetermined thickness in a direction toward an axis and forming the helical tooth, and a hollow portion extending from an axial side inner surface of the lobe portion toward an axial side, and the predetermined thickness of the lobe portion differs between a high load side on the outer periphery of the screw rotor and a low load side on the outer periphery.

Effects of the Invention

According to the invention, a pressure or thermal effect can be reduced while the mass of a screw rotor is reduced. Other problems, configurations, and effects of the invention will be apparent from the following description.

BRIEF DESCRIPTION OF THE DRAWINGS

FIG. 8 is a view schematically illustrating an axial longitudinal cross section of a screw rotor (female rotor) according to the second embodiment.

MODE FOR CARRYING OUT THE INVENTION

Hereinafter, modes for carrying out the invention will be described with reference to the drawings.

First Embodiment

A screw rotor in a first embodiment to which the invention is applied, a compressor main body, and a compressor will be described with reference to FIGS. 1 to 10.

Figure 1A:
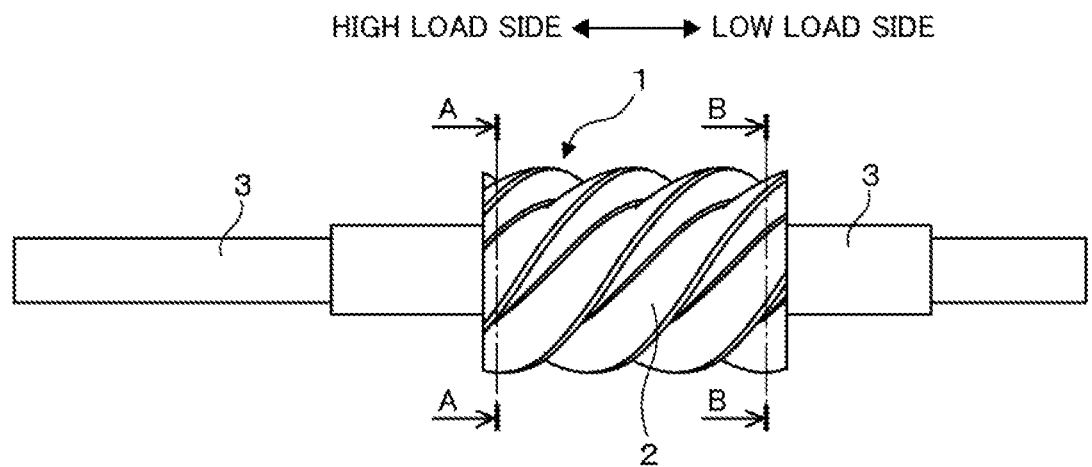
FIGS. 1A and 1B are views schematically illustrating an axial lateral appearance and an axial longitudinal cross section of a screw rotor (male rotor) according to a first embodiment to which the invention is applied.
Figure 1B:
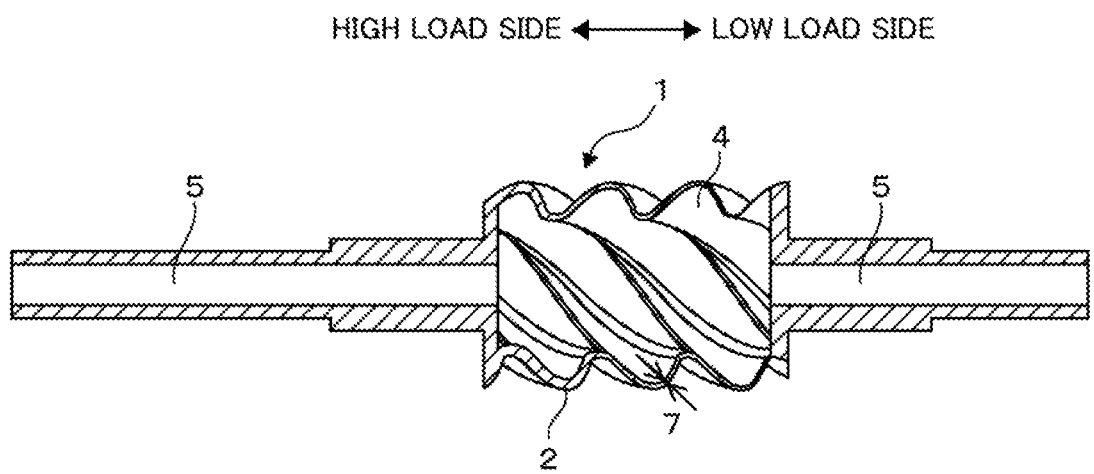

FIG. 1(*a*) illustrates an axial lateral appearance of a male rotor 1 of a hollow screw rotor, and FIG. 1(*b*) illustrates an axial longitudinal cross section of the male rotor 1. The male rotor 1 includes a lobe portion 2 (hereinafter, may be referred to as a "tooth") having a helical shape on an outer periphery of the male rotor 1, and includes rotor shaft portions at both axial ends of the lobe portion 2.

An axial side of the lobe portion 2 is a hollow portion that is an inner space along the helical shape of the lobe portion 2. Namely, the hollow portion 4 extends entirely from an axial side inner surface of the lobe portion 2 in a direction toward an axis. In addition, a rotor shaft portion 3 has a hollow hole 5 penetrating therethrough in the axial direction, and the hollow hole 5 communicates with the hollow portion 4. For example, a liquid medium (oil, water, coolant, or the like) or a vaporized medium for cooling or the like can flow through the hollow portion 4 from outside via the hollow hole 5.

Figure 2A:
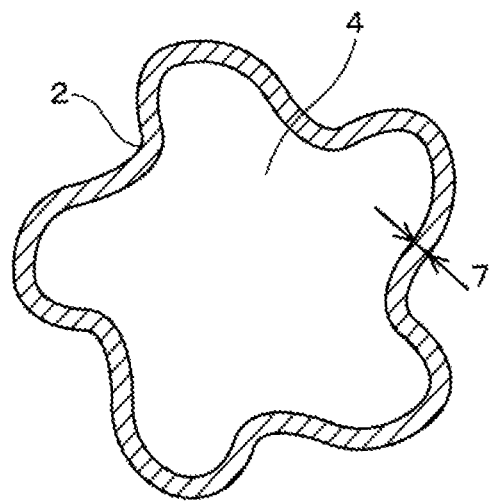
FIGS. 2A and 2B are view schematically illustrating a radial cross section of the screw rotor (male rotor) according to the first embodiment.
Figure 2B:
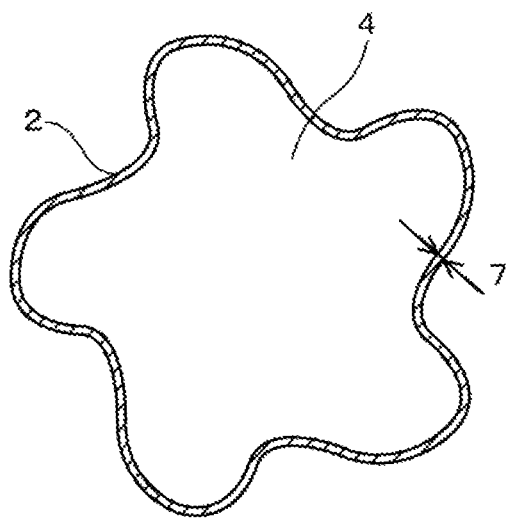

FIG. 2(*a*) illustrates a radial cross section of the male rotor 1 taken along line A-A in FIG. 1(*a*), and FIG. 2(*b*) illustrates a radial cross section of the male rotor 1 taken along line B-B in FIG. 1(*a*). One of the characteristics of the present embodiment is that a lobe portion thickness 7 that is a thickness from an outer surface of the lobe portion 2 to an inner surface of the hollow portion 4, the inner surface facing the outer surface in the direction toward the axis, is thick at an end corresponding to a high load side and is decreased toward an end corresponding to a low load side and forming a pair in the axial direction. Namely, the lobe portion thickness 7 differs the axial direction. In the present embodiment, the lobe portion thickness 7 is gradually increased in a (helical) tapered manner from the low load side toward the high load side; however, the lobe portion thickness 7 may be increased in a stepwise manner, for example, in N (natural number of one or larger) steps toward a high pressure side.

Figure 3A:
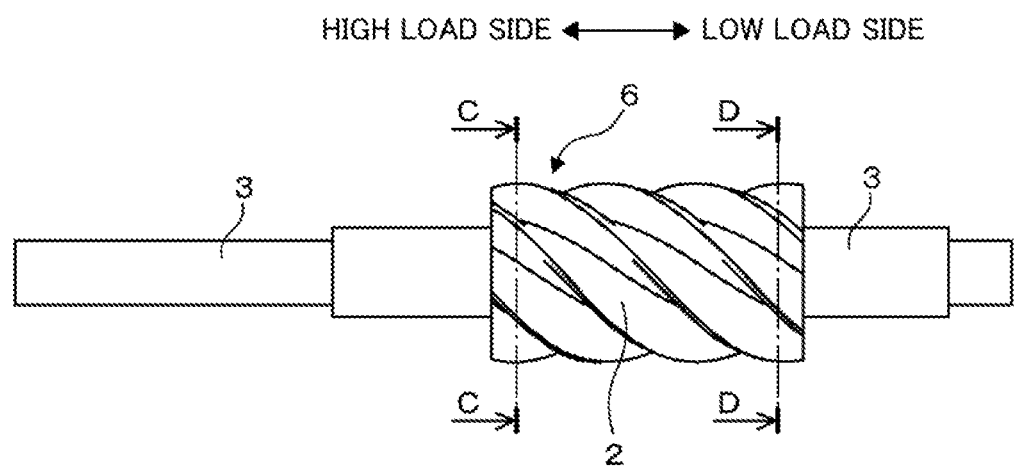
FIGS. 3A and 3B are views schematically illustrating an axial appearance and an axial longitudinal cross section of a screw rotor (female rotor) according to the first embodiment.
Figure 3B:
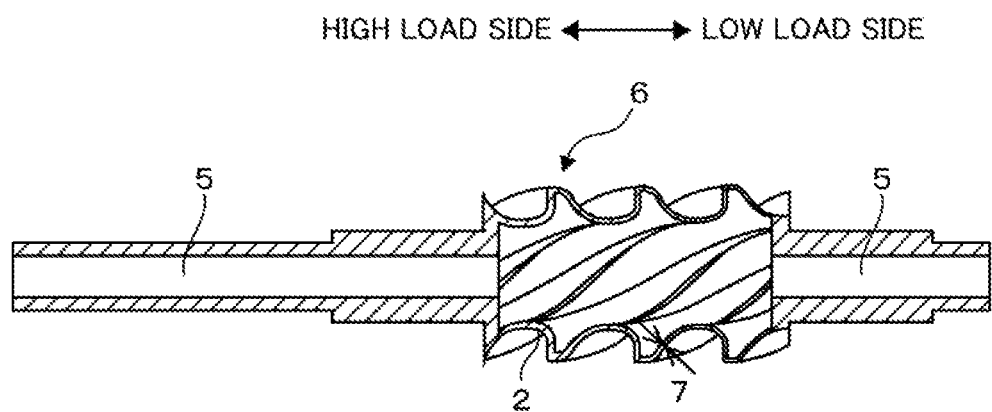

FIG. 3(*a*) illustrates an axial lateral appearance of a female rotor 6 of the hollow screw rotor, and FIG. 3(*b*) schematically illustrates an axial longitudinal cross section of the female rotor 6. Similar to the male rotor 1, the female rotor 6 includes the lobe portion 2 having a helical shape on an outer periphery of the female rotor 6, and includes the rotor shaft portions 3 at both axial ends of the lobe portion 2.

The axial side of the lobe portion 2 is the hollow portion 4 that is an inner space along the helical shape of the lobe portion 2. In addition, the rotor shaft portion 3 has the hollow hole 5 penetrating therethrough in the axial direction, and the hollow hole 5 communicates with the hollow portion 4. For example, a liquid medium (oil, water, coolant, or the like) or a vaporized medium for cooling or the like can flow through the hollow portion 4 from outside via the hollow hole 5.

Figure 4A:
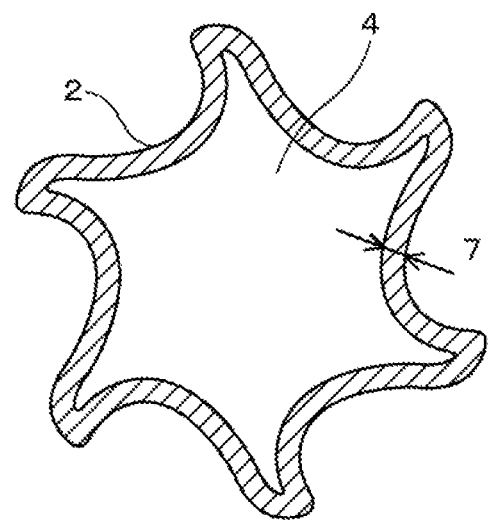
FIGS. 4A and 4B are views schematically illustrating a radial cross section of the screw rotor (female rotor) according to the first embodiment.
Figure 4B:
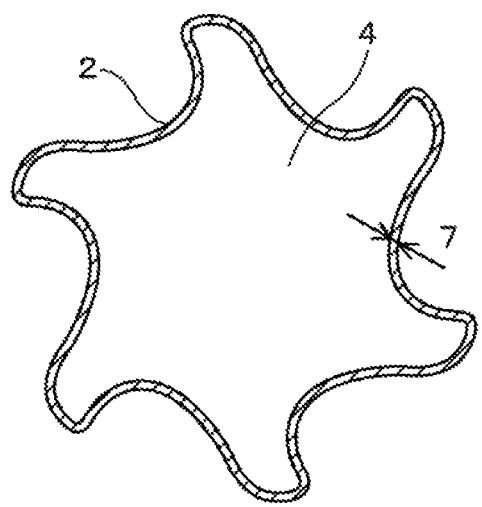

FIG. 4(*a*) illustrates a radial cross section of the female rotor 6 taken along line C-C in FIG. 3(*a*), and FIG. 4(*b*) illustrates a radial cross section of the female rotor 6 taken along line b-b in FIG. 3(*b*). One of the characteristics of the present embodiment is that similar to the male rotor 1, the lobe portion thickness 7 that is a thickness from the outer surface of the lobe portion 2 of the female rotor 6 to the inner surface of the hollow portion 4, the inner surface facing the outer surface in the direction toward the axis, is thick at an end corresponding to the high load side and is decreased toward an end corresponding to the low load side and forming a pair in the axial direction. Namely, the lobe portion thickness 7 differs in the axial direction. In the present embodiment, the lobe portion thickness 7 is gradually increased in a (helical) tapered manner from the low load side toward the high load side; however, the lobe portion thickness 7 may be increased in a stepwise manner, for example, in N (natural number of one or larger) steps toward a high pressure side.

Accordingly, it is possible to secure stress against heat or a high load associated with a reduction in mass of the hollow screw rotor. Particularly, the present embodiment has also an advantage that the shape of an outer peripheral surface of the lobe portion 2 is not required to be processed. Namely, regardless of whether the screw rotor is a single screw rotor, a twin screw rotor, or a multiple screw rotor, the outer peripheral surface of the lobe portion 2 is a portion that greatly affects (compression leakage or the like) compression working, and thus the shape that can be taken on a surface side is limited. The present embodiment has a shape characteristic on the axial side, and thus the present embodiment has an effect that the axial side becomes countermeasures against heat or a load while the compression performance is secured.

Here, for example, the male rotor 1 and the female rotor 6 are produced in such a manner that the base material is split into parts in the axial direction or in a radial direction and the casted and split parts are fixed together by welding, pressure joining, bolts, or the like; however, it is preferable that additive manufacturing or the like using a three-dimensional fabricating apparatus is used in a more complex configuration or to compensate for the lack of strength caused by the split configuration. Namely, the lobe portion 2 or the lobe portion 2 and the rotor shaft portion are three-dimensionally fabricated as a continuous and integral structure. Accordingly, the lobe portion thickness 7 or the shape thereof can be fabricated more complicatedly and accurately and the rotor is formed as a continuous and integral structure by chemical bonding; and thereby, the strength can be also secured.

As the additive manufacturing, a stereolithography method, a powder sintering additive manufacturing method, an ink jet method, a raw material melting additive method, a gypsum powder method, a sheet molding method, a film transfer image additive method, a metal stereolithography composite processing method, or the like can be applied. In addition, the material of the screw rotor may be resin or metal. Furthermore, a stacking direction may be a horizontal direction, a vertical direction, or an oblique direction with respect to the axis.

Electronic data for the above additive manufacturing is generated by processing three-dimensional data, which is generated by CAD or CG software or a three-dimensional scanner, into NC data using CAM. The data is input into a three-dimensional fabricating apparatus or a cutting RP apparatus to perform three-dimensional fabrication. Incidentally, NC data may be directly generated from three-dimensional data by CAD and CAM software.

In addition, as a method for acquiring three-dimensional data or the like, a data provider or servicer that creates the three-dimensional data or NC data can distribute the data in a predetermined file format via a communication line such as the Internet and a user downloads the data to a three-dimensional fabricating apparatus, a computer controlling the three-dimensional fabricating apparatus, or the like or makes access to the data using a cloud service. The three-dimensional fabricating apparatus can perform molding for production. Incidentally, it is also possible to adopt a method by which the data provider provides three-dimensional data or NC, data to the user in a state where the three-dimensional data or NC data is stored in a non-volatile storage medium.

Next, a compressor main body 8 including the male rotor 1 and the female rotor 6 will be described.

Figure 5A:
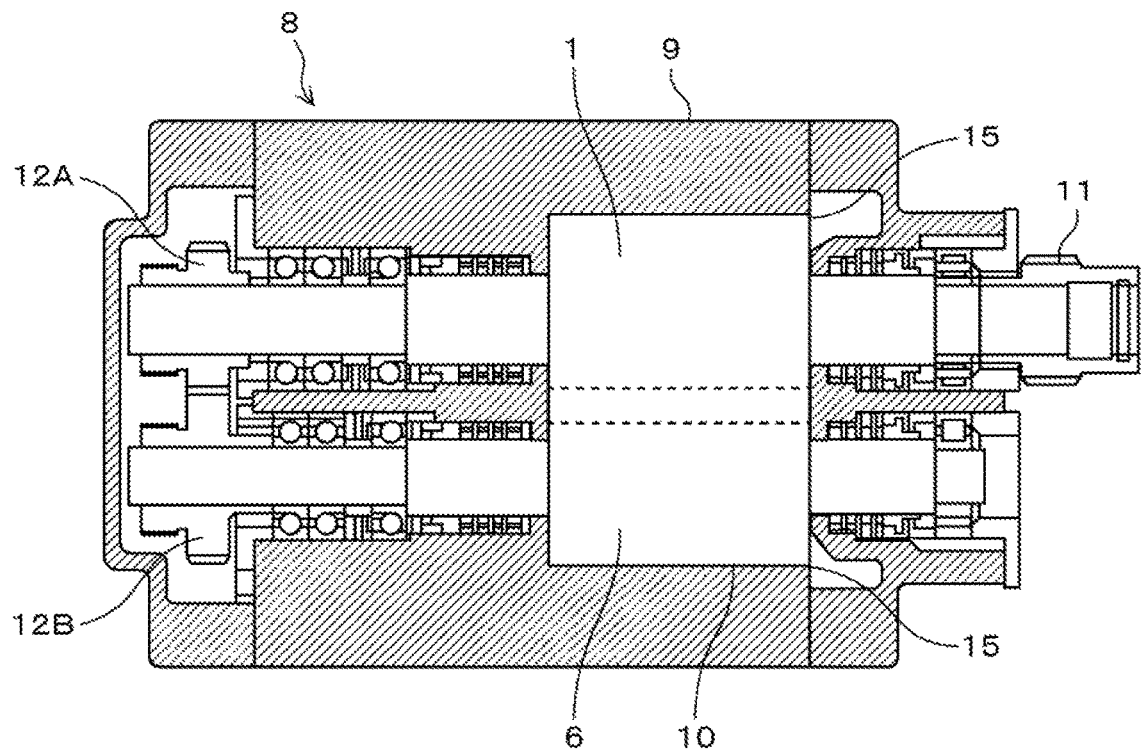
FIGS. 5A and 5B are views schematically illustrating an axial cross section of a compressor main body according to the first embodiment.
Figure 5B:
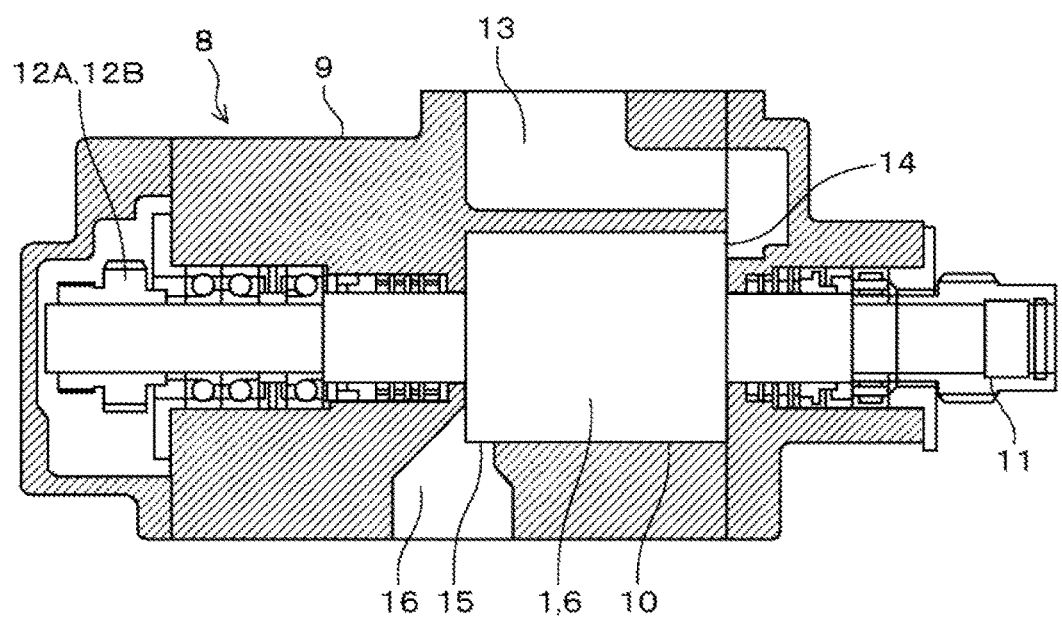

FIG. 5 schematically illustrates a configuration of the screw compressor main body 8. FIG. 5(*a*) is a cross-sectional transparent view when observed from an upper surface, and FIG. 5(b) is an axial cross-sectional view when observed from a lateral surface.

In the screw compressor main body 8, the male rotor 1 and the female rotor 6 meshing in parallel with each other are accommodated in a rotor chamber 10 that accommodates the rotors in a compressor main body casing 9. A pinion gear 11 attached to an intake side shaft end of the rotor shaft portion 3 of the male rotor 1 transmits the rotation of a motor, so that the male rotor 1 rotates. A structure where the rotation of the male rotor 1 is transmitted to the female rotor 6 by timing gears 12A and 12B attached to discharge side shaft ends of the male rotor 1 and the female rotor 6 to rotate the female rotor 6 is employed.

Gas suctioned into a screw compressor, more specifically, gas (for example, air) suctioned from an intake flow path 13 enters the rotor chamber from an intake port 14. The male rotor 1 and the female rotor 6 mesh with each other and the rotation of the rotors causes a compression working space, which is formed by the rotors and a wall surface of a bore of the rotor chamber 10, to move from an intake side to a discharge side while reducing the volume of the compression working space, to thereby generate compressed gas. The compressed gas is discharged from a discharge flow path 16 through a discharge port 15.

In the present embodiment, the lobe portion thickness 7 differs in the axial direction, and the lobe portion thickness 7 is made smaller on the intake side, on which a load such as the load of gas applied to an outer surface of the screw rotor is small, than on the discharge side, and thus the thickness can secure a minimum required strength against the load such as the load of gas. Therefore, the hollow portion of the lobe portion 2 can be made large while the strength of the screw rotor is maintained as much as possible. In addition, since the drive loss is reduced by a reduction in weight, an effect of reducing power can be increased.

Second Embodiment

Next, a second embodiment of the invention will be described with reference to the drawings. Incidentally, the same reference signs are assigned to members common to the first embodiment, and detailed descriptions may be omitted.

Figure 6:
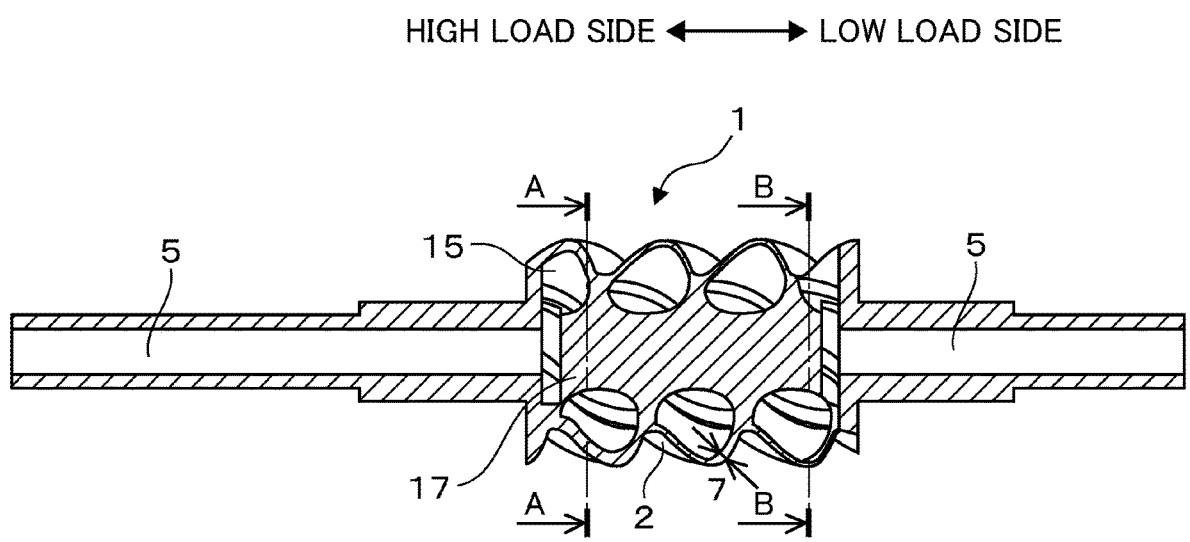
FIG. 6 is a view schematically illustrating an axial longitudinal cross section of a screw rotor (male rotor) according to a second embodiment to which the invention is applied.

FIG. 6 schematically illustrates an axial longitudinal cross section of the male rotor according to the second embodiment. In addition, FIG. 7 schematically illustrates a radial cross section of the male rotor 1, FIG. 7(a) is a radial cross-sectional view along line A-A in FIG. 6, and FIG. 7(b) is a radial cross-sectional view along line B-B in FIG. 6.

The second embodiment has the same outer peripheral shape of the lobe portion of a hollow screw rotor as that in the first embodiment, but differs from the first embodiment in that including a hollow portion 17 having a shape along the helical outer shape of a tooth portion and a sold portion 18 connected from a radial central portion of the lobe portion 2 to a tooth bottom portion of the tooth portion. Namely, one of the characteristics of the second embodiment is that the male rotor 1 includes the sold portion 18 at the center of the hollow portion and the solid portion 18 and an axial side tooth bottom of the lobe portion 2 form an integral structure. Namely, the hollow portion 17 extends from an axial side inner surface of the lobe portion 2 toward an axis and is formed as a space surrounded by an axial side of the tooth bottom and an outer periphery of the solid portion 18. This configuration has an effect of reinforcing the lobe portion 2.

Figure 7A:
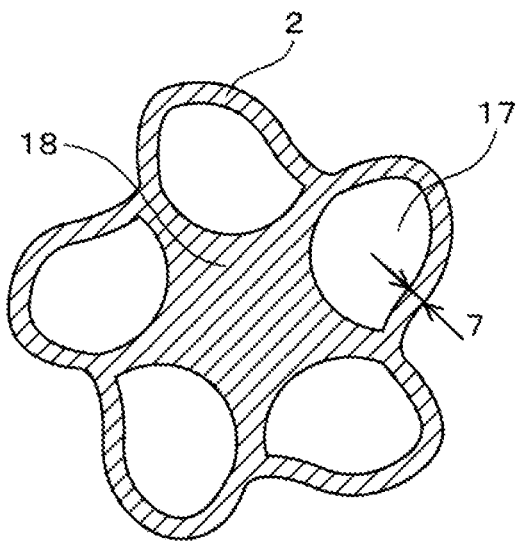
FIGS. 7A and 7B are views schematically illustrating a radial cross section of the screw rotor (male rotor) according to the second embodiment.
Figure 7B:
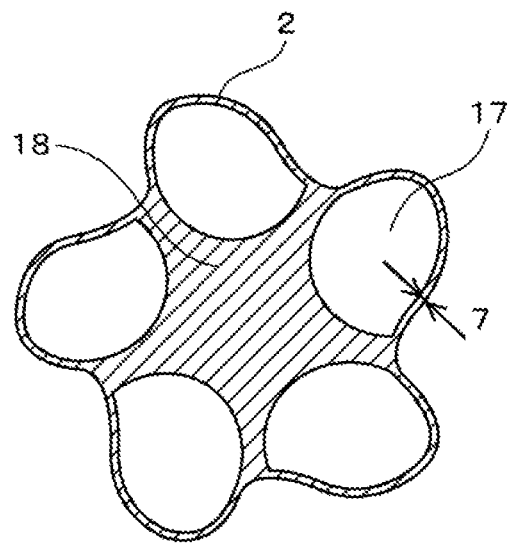

As illustrated in FIG. 7, the lobe portion thickness 7 on a high load side of the lobe portion 2 in FIG. 7(a) is thick unlike the lobe portion thickness 7 on a low load side of the lobe portion 2 in FIG. 7(b). Similar to the first embodiment, also in the second embodiment, the lobe portion thickness on the high pressure side affected by heat or a high load is made thick, and thus stress against the heat or high load can be secured.

FIG. 8 schematically illustrates an axial longitudinal cross section of the female rotor 6 in the second embodiment. In addition, FIG. 9 schematically illustrates a radial cross section of the female rotor 6, FIG. 9(a) is a radial cross-sectional view along line C-C in FIG. 8, and FIG. 9(b) is a radial cross-sectional view along line D-D in FIG. 8.

The second embodiment differs from the first embodiment in that the female rotor 6 includes the hollow portion 17 having a shape along the helical outer shape of a tooth portion and the solid portion 18 connected from the radial central portion of the lobe portion to the tooth bottom portion of the tooth portion. Namely, one of the characteristics of the second embodiment is that the female rotor 6 includes the solid portion 18 at the center of the hollow portion and the solid portion 18 and the axial side tooth bottom of the lobe portion 2 form an integral structure. With this configuration, the lobe portion 2 is reinforced.

Figure 9A:
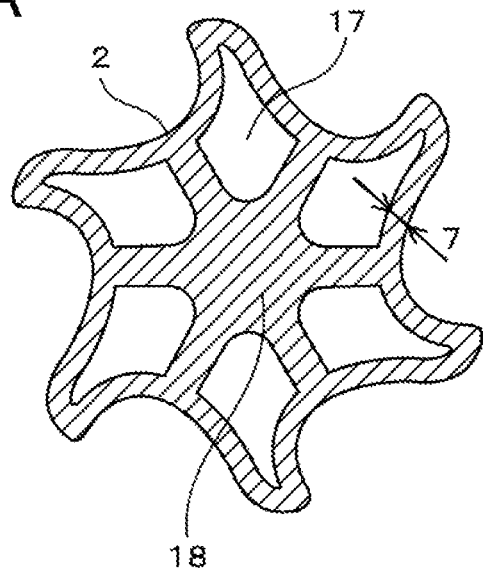
FIGS. 9A and 9B are views schematically illustrating a radial cross section of the screw rotor (female rotor) according to the second embodiment.
Figure 9B:
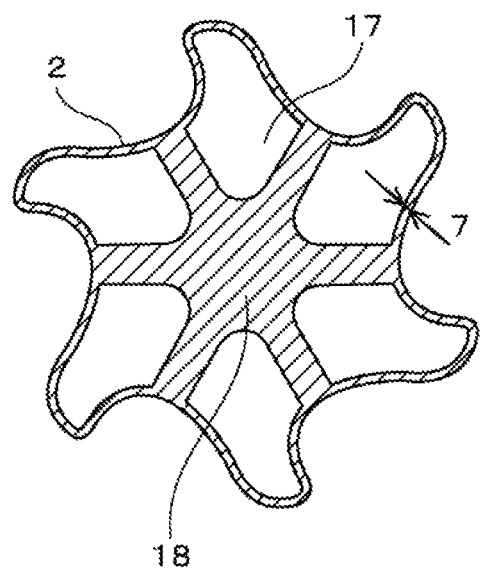

Then, as illustrated in FIG. 9, the lobe portion thickness 7 on the high load side of the lobe portion 2 in FIG. 9(a) is thick unlike the lobe portion thickness 7 on the low load side of the lobe portion 2 in FIG. 9(b). Similar to the first embodiment, also in the second embodiment, the lobe portion thickness on the high pressure side affected by heat or a high load is made thick, and thus stress against the heat or high load can be secured.

The modes for carrying out the invention have been described above; however, the invention is not limited to the above various embodiments, and various modifications or substitutions can be made without departing from the concept of the invention. For example, in the above embodiments, all of the screw rotors forming the screw compressor main body 8 are hollow; however, only either one screw rotor may be hollow (the other is solid). In addition, the male and female screw rotors of the first embodiment and the male and female screw rotors of the second embodiment can be also combined.

In addition, in the above embodiments, the male and female screw rotors have been provided as an example; however, the invention is also applicable to a rotor of a single screw compressor main body or a rotor of a multiple screw compressor main body. In the multiple screw compressor main body, the rotor of the above embodiments may be applied to all or at least one rotor.

In addition, in the above embodiments, the male rotor has five teeth and the female rotor 6 has six teeth; however, the number of teeth can be randomly changed depending on specifications.

In addition, the compressor is not limited to compressing air, and the compressor may compress other gas. In addition, in each of the embodiments, a rotor for an oil-free screw compressor main body has been provided as an example; however, the liquid to be supplied to the compression working chambers may be not only oil but also water or other liquid. In addition, the invention is also applicable to a lubricated screw compressor main body. Furthermore, the compressor main body may be configured to have a plurality of stages including two or more compressor bodies (a multi-stage configuration including a high-pressure stage compressor main body, a low-pressure stage compressor main body, and the like).

In addition, in the above embodiments, an air compressor has been provided as an example of a fluid machine; however, the invention is also applicable to an expander or a pump device. In a case where the invention is applied to the expander, a side into which compressed gas flows is a high load side and a side from which expanded gas is discharged has a low pressure. The gas flow direction has a reverse relationship with the lobe portion thickness 7.

In addition, in the above embodiments an electric motor has been described as a drive source; however, the drive source may be, for example, an internal combustion engine or other devices that generate a rotational force. Particularly, when the invention is applied to an expander, the expander may be configured such that a generator is provided instead of the electric motor or the electric motor is used as a motor generator.

REFERENCE SIGNS LIST

1 Male rotor
2 Lobe portion
3 Rotor shaft portion
4 Hollow portion.
5 Hollow hole
6 Female rotor
7 Lobe portion thickness
8 Screw compressor main body
9 Compressor main body casing
10 Rotor chamber
11 Pinion gear
12A Timing gear
12B Timing gear
13 Intake flow path
14 Intake port
15 Discharge port
16 Discharge flow path
17 Hollow portion
18 Solid portion

The invention claimed is:

1. A screw rotor having a helical tooth on an outer periphery, the helical tooth extending by a predetermined length in an axial direction,
wherein a radial cross section of the screw rotor includes
a lobe portion having a predetermined thickness in a direction toward an axis and forming the helical tooth, and a hollow portion extending from an axial side inner surface of the lobe portion toward an axial side, and
the predetermined thickness of the lobe portion differs between a high load side on the outer periphery of the screw rotor and a low load side on the outer periphery.

2. The screw rotor according to claim 1,
wherein the predetermined thickness on the high load side is thicker than the predetermined thickness on the low load side.

3. The screw rotor according to claim 2,
wherein the predetermined thickness is increased from the low load side toward the high load side.

4. The screw rotor according to claim 1,
wherein the hollow portion extends entirely in the direction toward the axis.

5. The screw rotor according to claim 1, further comprising:
a solid portion at an axis of the hollow portion, a length of the solid portion being substantially equal to a length of the hollow portion in the axial direction,
wherein an outer periphery of the solid portion and a tooth bottom of the lobe portion are connected to each other as an integral structure, and
the hollow portion is a space surrounded by the axial side inner surface of the lobe portion and the solid portion.

6. The screw rotor according to claim 1, further comprising:
hollow holes at both axial end portions of the helical tooth, the hollow portion and an outside communicating with each other through the hollow holes,
wherein a liquid or gas medium is flowable through the hollow portion via the hollow holes.

7. The screw rotor according to claim 1,
wherein both axial end portions of the helical tooth and the lobe portion extending by a predetermined length in the axial direction are molded by casting.

8. The screw rotor according to claim 1,
wherein both axial end portions of the helical tooth and the lobe portion extending by a predetermined length in the axial direction are formed as an integral structure.

9. The screw rotor according to claim 8,
wherein the integral structure is formed by a three-dimensional fabricating apparatus.

10. A fluid machine main body including a screw rotor that has a helical tooth extending by a predetermined length in an axial direction on an outer periphery, and a casing that has an inner wall of a bore accommodating the screw rotor,
wherein a radial cross section of the screw rotor includes
a lobe portion having a predetermined thickness in a direction toward an axis and forming the helical tooth, and a hollow portion extending from an axial side inner surface of the lobe portion toward an axial side, and
the predetermined thickness of the lobe portion differs between a high load side on the outer periphery of the screw rotor and a low load side on the outer periphery.

11. The fluid machine main body according to claim 10,
wherein the predetermined thickness on the high load side of the lobe portion is thicker than the predetermined thickness on the low load side.

12. The fluid machine main body according to claim 11,
wherein the predetermined thickness of the lobe portion is increased from the low load side toward the high load side.

13. The fluid machine main body according to claim 10,
wherein the hollow portion extends entirely in the direction toward the axis.

14. The fluid machine main body according to claim 10, further comprising:
a solid portion at an axis of the hollow portion, a length of the solid portion being substantially equal to a length of the hollow portion in the axial direction,
wherein an outer periphery of the solid portion and a tooth bottom of the lobe portion are connected to each other as an integral structure, and
the hollow portion is a space surrounded by the axial side inner surface of the lobe portion and the solid portion.

15. The fluid machine main body according to claim 10, further comprising:
hollow holes at both axial end portions of the helical tooth, the hollow portion and an outside communicating with each other through the hollow holes, wherein a liquid or gas medium is flowable through the hollow portion via the hollow holes.

16. The fluid machine main body according to claim 10, wherein both axial end portions of the helical tooth and the lobe portion extending by a predetermined length in the axial direction are molded by casting.

17. The fluid machine main body according to claim 10, wherein both axial end portions of the helical tooth and the lobe portion extending by a predetermined length in the axial direction are formed as an integral structure.

18. The fluid machine main body according to claim 17, wherein the integral structure is formed by a three-dimensional fabricating apparatus.

19. The fluid machine main body according to claim 10, wherein the fluid machine main body includes one or a plurality of the scree rotors and at least one of the screw rotors includes the hollow portion.

20. The fluid machine main body according to claim 10, wherein the fluid machine main body is a compressor main body, a pump device main body, or an expander main body.

* * * * *